United States Patent [19]

Hattori et al.

[11] Patent Number: 4,696,201
[45] Date of Patent: Sep. 29, 1987

[54] GEAR ASSEMBLY FOR TRANSMITTING ROTATION BETWEEN TWO SHAFTS

[75] Inventors: Kyo Hattori; Kazuo Kato; Shuji Morita, all of Toyota, Japan

[73] Assignee: Toyota Jidosha Kabushiki Kaisha, Aichi, Japan

[21] Appl. No.: 793,269

[22] Filed: Oct. 29, 1985

[30] Foreign Application Priority Data

Jan. 26, 1985 [JP] Japan ............................... 60-8653[U]

[51] Int. Cl.⁴ ............................................. F16H 57/04
[52] U.S. Cl. ........................................ 74/467; 74/440; 184/6.12
[58] Field of Search ................. 184/6.12; 74/467, 468, 74/409, 440, 439

[56] References Cited

U.S. PATENT DOCUMENTS

| | | | |
|---|---|---|---|
| 1,539,149 | 5/1925 | Thornburg | 74/440 |
| 1,619,799 | 3/1927 | Rounds et al. | 74/440 |
| 1,648,715 | 11/1927 | Bean | 74/440 |
| 2,748,618 | 6/1956 | Lee | 74/439 |
| 2,859,635 | 11/1958 | Lee | 74/439 |
| 2,966,806 | 1/1961 | Luning | 74/440 |
| 2,972,903 | 2/1961 | Lee | 184/6.12 |
| 3,822,607 | 7/1974 | Tharaldson | 184/6.12 |

Primary Examiner—Cornelius J. Husar
Assistant Examiner—Joseph A. Fischetti
Attorney, Agent, or Firm—Parkhurst & Oliff

[57] ABSTRACT

A gear assembly having first and second gears in constant mesh with each other, the second gear being divided into two gear elements by a plane perpendicular to the axis thereof. A passage through which lubricating oil flows is formed between these two gear elements. The passage preferably consists of a radial groove formed on a surface of one of the two gear elements to extend in a radial direction from the inner surface of the gear element, an annular groove formed on the surface to extend in a circular direction about the axis of the gear element and communicate with the outer end portion of the radial groove, and a clearance formed between the two gear elements and surrounding the annular groove.

7 Claims, 6 Drawing Figures

GEAR ASSEMBLY FOR TRANSMITTING ROTATION BETWEEN TWO SHAFTS

BACKGROUND OF THE INVENTION

1. Field of the Invention

The present invention relates to a gear assembly for transmitting rotation between two shafts. More particularly, it relates to a construction for ensuring the lubrication of such a gear assembly.

2. Description of the Related Art

In a double overhead camshaft (DOHC) engine, two camshafts, located above a cylinder head, are provided with cams opening and closing intake and exhaust valves, respectively. The two camshafts are provided with gears which are in constant mesh with each other, and thus the camshafts are rotated synchronously so that the intake and exhaust valves are opened and closed at a predetermined timing.

In a conventional DOHC engine, a means for supplying lubricating oil to the gears is constructed in such a manner that the oil is supplied to a portion of the gears at which the teeth of the gears are actually in mesh, in a direction along the axis of the shafts. If the supply means is constructed in such a manner that the oil is supplied to the meshing portion in a rotational direction of the shafts, the oil is spread relatively effectively in the meshing portion. However, the supply means cannot be always provided in the farther side of the rotational direction of the gears because of the construction of a head cover mounted on the cylinder head. Therefore, the supply means must be situated at one side of the meshing portion. As a result, lubricating oil discharged from the supply means collides with a side surface of the gears and a certain proportion of the oil is not supplied into the meshing portion but is diverted into the valve mechanism and seeps into the valves. Accordingly, the supply means must supply an increased quantity of oil to the gears. Thus, if the quantity of oil diverted by collision with the side of the gear is increased, the quantity of oil seeping into a PCV valve provided between a crankcase and an intake manifold is increased, so that not only does the exhaust gas emission become worse, but also the oil consumption becomes higher. Further, a large capacity oil pump must be provided to prevent oil pressure at other portions of the head cover from dropping.

SUMMARY OF THE INVENTION

Therefore, an object of the present invention is to provide a gear assembly by which the lubricating oil is effectively supplied to all of the meshing portion of the gears.

According to the present invention, there is provided a gear assembly comprising a first gear fitted to one of the camshafts, a second gear fitted to the other of the camshafts and meshed with the first gear, and lubricating means lubricating a portion at which the teeth of the first and second gears are in mesh with each other (hereinafter referred to as the meshing portion). The second gear is divided into two gear elements by a plane perpendicular to the axis thereof. The lubricating means comprises a passage formed between the two gear elements, and a supply source supplying lubricating oil to the passage in such a manner that the lubricating oil flows to the meshing portion. The passage extends in a radial direction relative to the axis of the first and second gears.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

The present invention will now be described with reference to the preferred embodiments of the present invention, with reference to the accompanying drawings.

Figure 1:
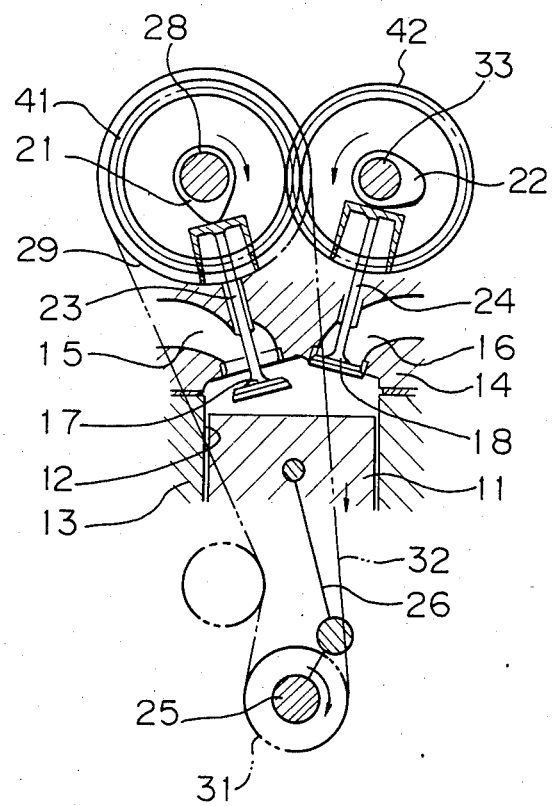
FIG. 1 is a sectional view of a driving system for the cams of a DOHC engine.

FIG. 1 shows a DOHC engine to which the present invention is applied. In the drawing, a piston 11 is slidably housed in a cylinder bore 12 formed in a cylinder block 13, on which a cylinder head 14 having an intake port 15 and an exhaust port 16 is mounted. An intake valve 17 and an exhaust valve 18 are provided in the cylinder head 14 to open and close the intake port 15 and the exhaust port 16, respectively. The valves 17 and 18 are opened and closed by cams 21 and 22 located at the end portions of valve stems 23 and 24 of the valves 17 and 18.

The cams 21 and 22 are fixedly mounted onto a first camshaft 28 and a second camshaft 33, respectively, which are rotated by a crankshaft 25 which, in turn, is rotated by a reciprocal motion of the piston 11 transmitted through a connecting rod 26. The first camshaft 28 is fitted with a pulley 29 connected to a pulley 31 provided on one end of the crankshaft 25 through an endless timing belt 32, so that the rotation of the crankshaft 25 is transmitted to the camshaft 28 and thus the cam 21. A first gear 41 fitted to the first camshaft 28 meshes with a second gear 42 fitted to the second camshaft 33, so that rotation of the first camshaft 28 is transmitted to the second camshaft 33.

Figure 2:
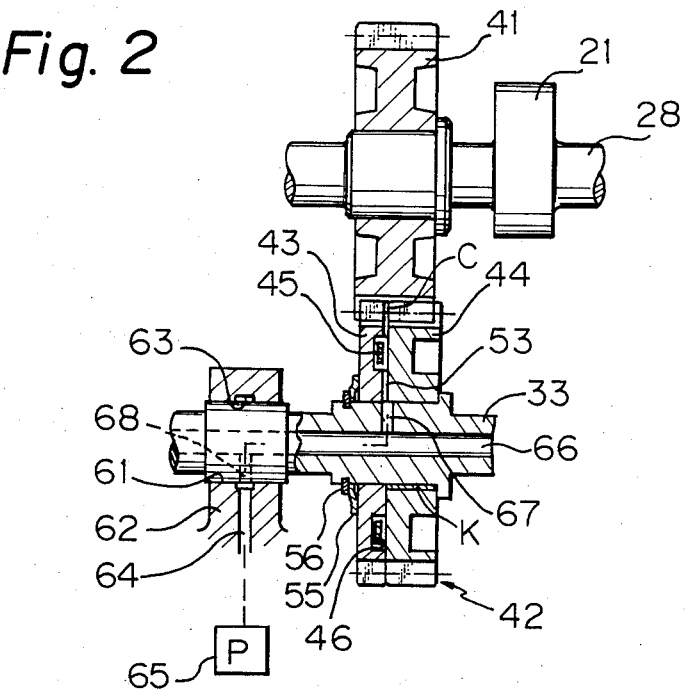
FIG. 2 is a sectional view of a first embodiment of the present invention.
Figure 3:
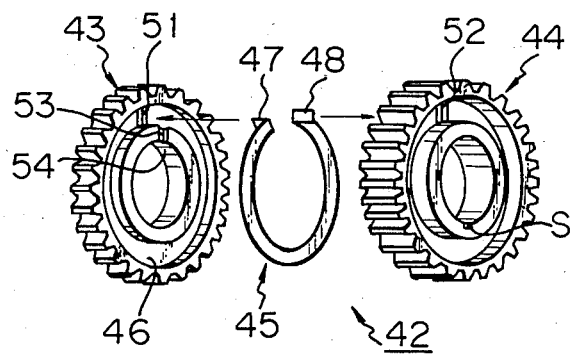
FIG. 3 is a perspective view of the second gear in a disassembled state.

In this embodiment, as shown in FIGS. 2 and 3, the second gear 42 has a gear element 43 and a gear element 44 which are formed by dividing the second gear 42 into two parts by a plane perpendicular to the axis of the second gear 42. The second gear 42 further has a C-shaped spring 45 which is housed in an annular groove 46 formed in the gear element 43. Two end portions 47 and 48 of the C-shaped spring 45 are bent to the axial direction and inserted into holes 51 and 52 formed in the gear elements 43 and 44, respectively, so that the gear elements 43 and 44 are urged in opposite circumferential directions and thus a tooth of the gear element 43 and a tooth of the gear element 44 hold a tooth of the first gear 41 in such a manner that backlash between the first and second gears 41 and 42 is eliminated. A radial groove 53 is formed on a surface of the inside of the annular groove 46, and extends in a radial direction from an inner surface 54 of the gear element 43. The second gear elements 43 and 44 are fitted to the second camshaft 33 in such a manner that the surface of the gear element 43, on which the annular groove 46 and the radial groove 53 are formed, faces the gear element 44, as shown in FIG. 2. The gear element 44 is fixed to the second camshaft 33 by a key k for insertion in a slot s and thus cannot rotate relative to the second camshaft 33. Conversely, the gear element 43 is fitted to the second camshaft 33 in such a manner that it can rotate relative to the second camshaft 33, that is, the gear element 43 can rotate relative to the gear element 44. A thrust spring 55 is supported by a snap ring 56 fitted to the second camshaft 33, to press the gear element 43 against the gear element 44.

A passage for supplying lubricating oil to a meshing portion of the first and second gears 41 and 42 is formed between the gear elements 43 and 44. This passage is composed of the radial groove 53, the annular groove 46, and a clearance c formed between the gear elements 43 and 44 and surrounding the annular groove 46. That is, the annular groove 46 extends in a circumferential direction about the axis of the second gear 42 and communicates with the outer end portion of the radial groove 53, so that the meshing portion of the second gear 42 is communicated with the inner surface 54 through the radial groove 53, the annular groove 46, and the clearance.

The second camshaft 33 is rotatably and slidably supported by an inner portion 61 of a bearing housing 62 formed on the cylinder head 14. An annular oil groove 63 is formed on this inner surface of the bearing housing 62, and an oil path 64 communicating the annular oil groove 63 and an oil pump 65 is formed in the bearing housing 62. The second camshaft 33 is formed with an axial hole 66 extending along the axis thereof, and first and second radial holes 67 and 68. The first radial hole 67 communicates the axial hole 66 to the radial groove 53, and the second radial hole 68 communicates the axial hole 66 to the annular oil groove 63.

Therefore, lubricating oil discharged from the oil pump 65 passes through the oil path 64, the annular oil groove 63, the second radial hole 68, the axial hole 66, and the first radial hole 67, to flow into the passage formed between the gear elements 43 and 44. Thus, the oil flows into the radial groove 53 and reaches the annular groove 46. The oil in the annular groove 46 is moved to the clearance formed between the outer surface portions of the gear elements 43 and 44 by a centrifugal force generated by rotation of the second gear 42, and flows to the meshing portion of the first and second gears 41 and 42 to lubricate that portion.

As mentioned above, the lubricating oil is supplied to the meshing portion through the inner portion of the second gear 42. Therefore, complete lubrication of the meshing portion is ensured, and the quantity of oil diverted into a cam chamber formed by the cylinder head 14 and head cover is reduced. Accordingly, oil consumption can be restrained to a minimum value, and thus only a small capacity oil pump 65 need be provided. Further, since the quantity of oil seeping to a PCV valve is drastically reduced, the exhaust gas emission is improved.

Note, the thrust spring urging the gear elements 43 and 44 together need not be provided, and the second gear 42 may be constructed by arranging a plurality of gear elements side by side.

Although, the annular groove 46 housing the C-shaped spring 45 is a part of the passage for lubricating oil in the embodiment described above, the annular groove 46 can be formed on any portion located inside the outer teeth of the second gear 42. For example, the annular groove 46 may be formed on the outer surface of the second camshaft 33 or the inner surface of the second gear 42. Further, the annular groove 46 may be formed on the surface of the second gear element 44.

Figure 4:
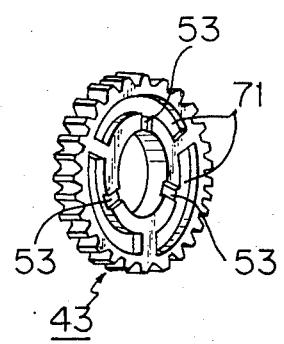
FIG. 4 is a perspective view of one gear element of a second embodiment of the present invention.
Figure 5:
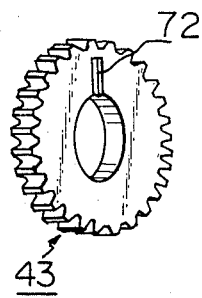
FIG. 5 is a perspective view of one gear element of a third embodiment of the present invention; and, FIG. 6 is a perspective view of one gear element of a fourth embodiment of the present invention.
Figure 6:
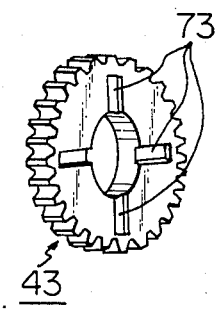

The groove 46 is not necessarily circular, but may be composed of a plurality of arc-shaped grooves 71 formed on a surface of the gear element 43 so as to surround the axis of the gear element 43, as shown in FIG. 4. In this construction, the radial grooves 53 are formed corresponding to the arc shaped grooves 71. Or the groove 46 may be substituted by a groove 72 extending in a radial direction as shown in FIG. 5, or grooves 73 extending in radial directions as shown in FIG. 6.

While embodiments of the present invention have been described herein with reference to the attached drawings, many modifications and changes may be made by those skilled in this art without departing from the scope of the invention.

We claim:

1. A gear assembly for transmitting rotation between two camshafts which have cams for opening or closing intake or exhaust valves of a double overhead camshaft engine, comprising;
    a first gear fitted to one of said camshafts,
    a second gear fitted to the other of said camshafts, teeth of said second gear meshing with teeth of said first gear, said second gear being divided into two gear elements by a plane perpendicular to the axis thereof, said second gear further including a spring urging said two gear elements in opposite circumferential directions so that a tooth of one of said two gear elements and a tooth of another of said two gear elements hold a tooth of said first gear so that backlash between said first and second gears is eliminated,
    means for pressurizing lubricating oil including a pressurized lubricant supply source, and
    means for lubricating a meshing portion at which teeth of said first and second gears are mated to each other, said lubricating means having a passage formed between said two gear elements including a clearance between the teeth of said two gear elements of said second gear, said clearance extending from a bottom land to a crest of the teeth, said pressurized lubricant supply source supplying pressurized lubricating oil to said passage so that lubricating oil flows to the entire surface of said teeth in said meshing portion, said spring being located within said passage.

2. A gear assembly according to claim 1, wherein said passage has a radial groove formed on a surface of one of said two gear elements to extend in a radial direction.

3. A gear assembly according to claim 1, wherein said passage has an annular groove formed on a surface of one of said two gear elements to extend in a circumferential direction about the axis of said two gear elements.

4. A gear assembly according to claim 1, wherein said passage has a radial groove formed on a surface of one of said two gear elements to extend in a radial direction from the inner surface of said gear element, an annular groove formed on said surface to extend in a circumferential direction about the axis of said two gear elements and communicate with the outer end of said radial groove, and a clearance formed between said two gear elements and surrounding said annular groove.

5. A gear assembly according to claim 1, wherein said passage has a plurality of arc-shaped grooves formed on a surface of one of said two gear elements so as to surround the axis of said gear elements.

6. A gear assembly according to claim 1, wherein said supply source has an axial hole formed in the camshaft to which said second gear is fitted, a radial hole formed in said camshaft so as to communicate said axial hole and said passage, and an oil pump discharging lubricating oil into said axial hole.

7. A gear assembly according to claim 1, wherein said spring is provided in an annular groove formed on a surface of one of said two gear elements, said annular groove being a part of said passage.

* * * * *